United States Patent [19]
Tuhro

[11] 3,784,795
[45] Jan. 8, 1974

[54] LABEL READER

[75] Inventor: Richard H. Tuhro, Norwood, Mass.

[73] Assignee: Computer Identics Corporation, Westwood, Mass.

[22] Filed: June 20, 1972

[21] Appl. No.: 264,485

[52] U.S. Cl. ....................... 235/61.11 E, 250/219 D
[51] Int. Cl. ............................................. G06k 7/10
[58] Field of Search ................................ 250/219 D; 235/61.11 R, 61.11 D, 61.11 E; 340/146.3 K; 328/173

[56] References Cited

UNITED STATES PATENTS

| | | | |
|---|---|---|---|
| 3,402,299 | 9/1968 | Held | 250/219 D |
| 3,320,430 | 5/1967 | Gorman | 235/61.11 E |

OTHER PUBLICATIONS

Landee et al., "Electronic Designers' Handbook," 1957, McGraw-Hill Book Co.

*Primary Examiner*—Thomas J. Sloyan
*Attorney*—Joseph S. Iandiorio

[57] ABSTRACT

In a label reading system for reading marks formed of at least two segments the improvement including circuit means for excepting a signal derived from a contrasting gap between two such segments including a capacitor and a charging circuit for charging said capacitor; gating means for discharging said capacitor in response to a signal derived from a gap and enabling the charging circuit to charge the circuit in response to a signal derived from a segment; a comparator having a first input connected to the capacitor and a second input connected to a reference voltage; and a clipping circuit connected to the first input to limit the voltage to which the capacitor can be charged to a value greater than the reference voltage for standardizing the initial level at which discharge of the capacitor begins at the end of each segment.

2 Claims, 13 Drawing Figures

LABEL READER

FIELD OF INVENTION

This invention relates to a label reading system for reading imperfectly printed labels, and more particularly to such a system for excepting signals derived from undesired contrasting gaps in the coding marks.

BACKGROUND OF INVENTION

Typically machine readable labels used in conjunction with automatic label reading machines are preprinted with predetermined information using sharply defined coding marks on well contrasted backgrounds. As such automatic label reading systems have become more available and more widely known by industry ever newer and more different uses have been suggested for them. For example in one application a person known as a "picker" in a warehouse is given a list of labels each containing an identification of an item to be picked and other information such as the buyer's name, serial number, order number, price, etc. In addition each label contains coded indicia representing the loading dock or assembly point for each order. Thus the list can be arranged for most efficient use by the picker yet the goods can be accumulated by order number by means of automatic conveyors controlled by label reading machines. In this illustrative application and many other applications it has become increasingly more desirable to print these labels using a computer which compiles and orders the list. Computer printed labels have introduced new problems into the label reading operation. For example, some labels use a bar code wherein a binary number is encoded by a series of narrow and wide marks or stripes. To achieve such a mark or stripe a computer printed label uses a slug key to produce a series of rectangular forms arranged in a line. But these rectangular forms do not print continuously and so a segmented bar not a solid bar is produced. Thus the stripe or mark is made of a series of segments separated by contrasting spaces or gaps. The contrasting gaps between segments can cause erroneous readings.

SUMMARY OF INVENTION

It is therefore an object of this invention to provide a label reading system for reading imperfectly printed labels.

It is a further object of this invention to provide a label reading system for reading computer printed information on labels.

It is a further object of this invention to provide a label reading system capable of excepting signals derived from gaps or spaces in marks which otherwise ideally occur as continuous forms.

The invention featues, in a label reading system for reading marks formed of at least two segments, the improvement including circuit means for excepting a signal derived from a contrasting gap between two such segments. There is a capacitor and a charging circuit for charging the capacitor. Gating means discharge the capacitor in response to a signal derived from a gap and enable the charging circuit to charge the capacitor in response to a signal derived from a segment. A comparator has a first input connected to the capacitor and a second input connected to a reference voltage. A clipping circuit connected to the first input limits the voltage to which the capacitor can be charged to a value greater than the reference voltage for standardizing the initial level at which discharge of the capacitor begins at the end of each segment.

DISCLOSURE OF PREFERRED EMBODIMENT

Other objects, features and advantages will occur from the following description of a preferred embodiment and the accompanying drawings, in which.

Figure 6:
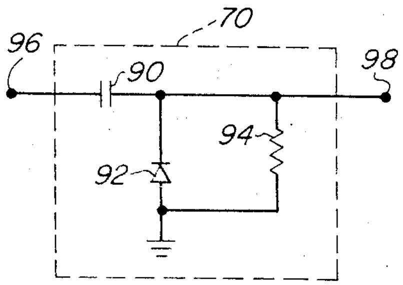
FIG. 6 is a more detailed schematic view of a noise level suppressor shown in FIG. 4.

FIG. **7*a* is an illustration of the waveform at the input terminal of the noise level suppressor shown in FIG. 6**.

FIG. **7*b* is an illustration of the waveform at the output terminal of the noise level suppressor of FIG. 6**.

Figures 4, 8:
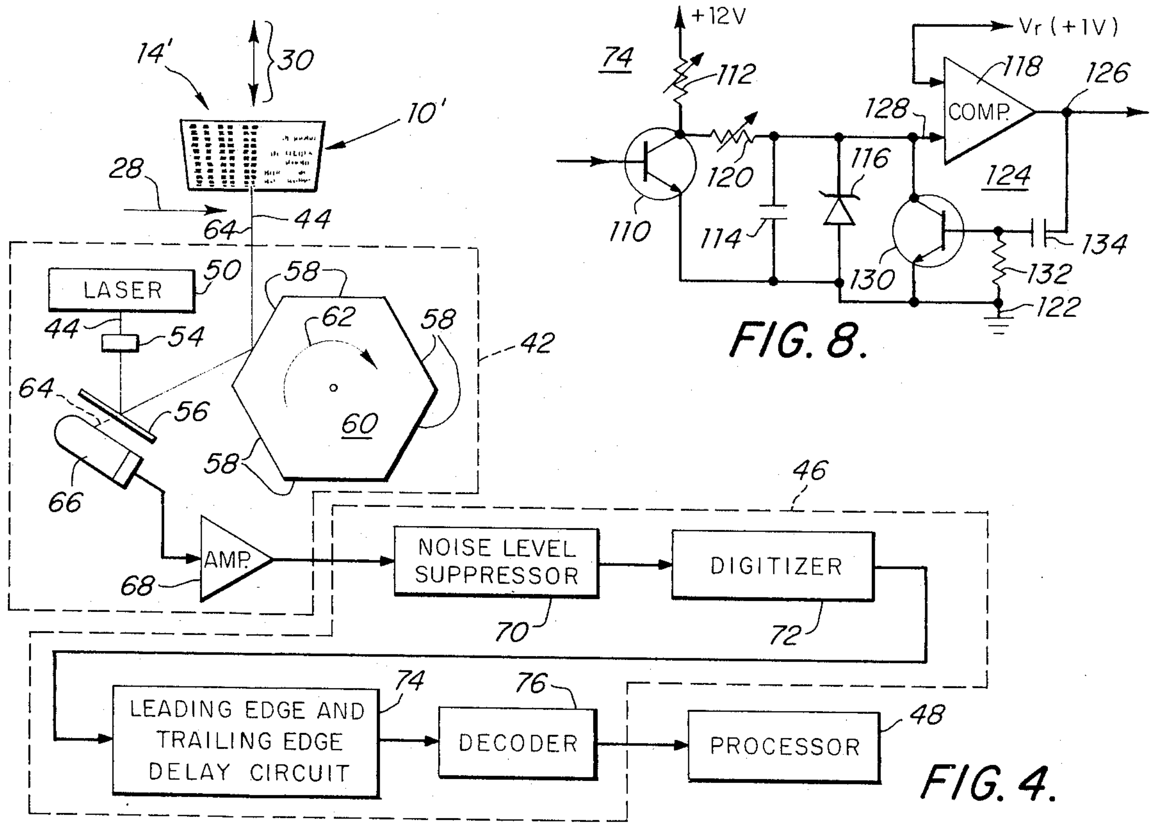
FIG. 4 is a schematic, block diagram of the scanner and reader portions of the label reading system shown in FIG. 3.

FIG. 8 is a more detailed schematic diagram of the leading edge and trailing edge delay circuit shown in FIG. 4.

FIG. **9*a* illustrates the analog waveform at the input to the digitizer shown in FIG. 4**.

FIG. **9*b* illustrates the digitized waveform at the input to the leading edge and trailing edge delay circuit shown in FIGS. 4 and 8**.

FIG. **9*c* illustrates the waveform at the input to the comparator in FIG.8**.

FIG. **9*d* illustrates the waveform at the output of the comparator in FIG. 8**.

Figure 1:
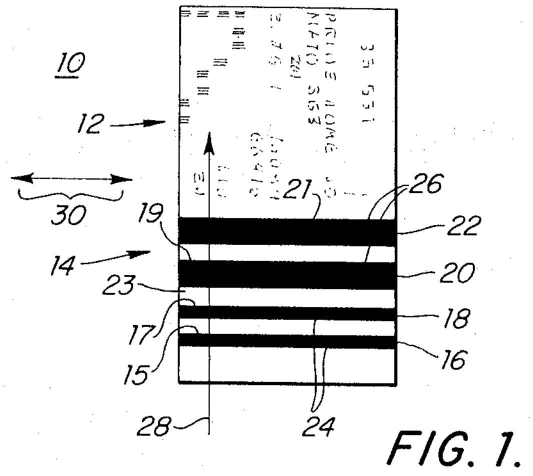
FIG. 1 is a view of a label showing an idealized version of the coded machine readable portion.
Figure 2:
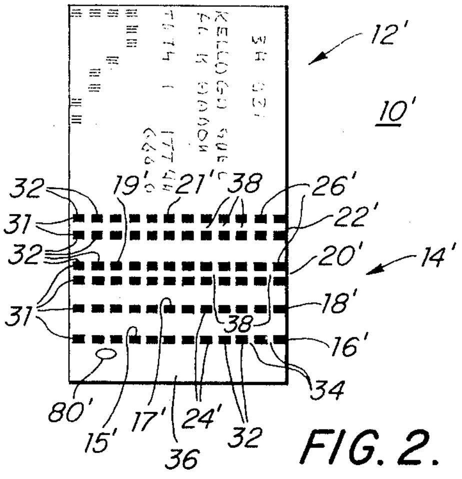
FIG. 2 is a view of an imperfectly printed computer label, similar to that in FIG. 1, having marks or stripes formed of segments with gaps between them and readable using the improved label reader according to this invention.

There is shown in FIG. 1 a typical label 10 used with an automatic label reading system. Label 10 includes a first section 12 which contains man readable information and a second section 14 which includes machine readable information. As illustrated in FIG. 1 the coded information printed in section 14 is a four position binary code each of the four positions 16, 18, 20 and 22 contains a mark which is either a narrow stripe 24 such as shown in positions 16 and 18 which indicates a binary zero or a wide stripe 26 such as occurs at positions 20 and 22 which indicates a binary one. Typically label 10 is read by a scanning beam which scans vertically from the bottom up as shown by arrow 28 as label 10 moves in either direction transverse to the scan as indicated by arrows 30. The four stripes 15, 17, 19, and 21 at positions 16, 18, 20 and 22 represent the binary code 0011 or decimal three when scanned in the direction of arrow 28, since there are two narrow stripes followed by two wide stripes. The marks or stripes 15, 17, 19 and 21 are spaced apart by contrasting areas 23 of the label background which has contrasting reflective properties relative to the stripes i.e., if stripes 15, 17, 19 and 21 are printed with black ink, areas 23 would be printed with white or gray; if stripes 15, 17, 19 and 21 were made with retroreflective material areas 23 would be of less retroreflective material. The coded information in section 14 of label 10 as illustrated in FIG. 1 is printed by conventional printing methods so that the marks, narrow 24 and wide 26 stripes, are a solid, uniform color with clearly defined boundaries. However, when such a label is printed by a computer by means, for example, of a computer peripheral printer the resulting label may appear as label 10', FIG. 2, where like parts have been given like numbers primed. Each narrow mark or stripe 24' may be formed by a row 31 of segments 32 separated along a direction transverse to the scanning direction by gaps 34 aligned in the direction of scanning. The gaps 34 are formed of the contrasting material provided by the background 36 of label 10'. Similarly the wide marks or stripes 26' are formed of two rows 31 of segments 32 separated in a direction transverse to the scanning path 28 by gaps 34 and separated from each other in the direction along the scanning path by gaps 38 aligned in a direction transverse to the scanning direction.

The presence of gaps 34 and 38 and the poor printing quality of segments 32 such as poor uniformity and poor contrast create a number of problems which can give rise to errors in the label reading system. First, a beam scanning vertically upward across label 10' as in the direction indicated by arrow 28 will encounter a gap 38 in the center of a wide stripe 26'. In some cases where the gap 38 is sufficiently wide such as occurs in stripes 19' and 21' the presence of a gap 38 may be interpreted as an authentic space between stripes in which case the label reading system would respond to each of the wide strips 19' and 21' as two narrow stripes rather than one wide stripe. Second, the scanning beam is very narrow. Typically it is a laser beam having a diameter of approximately forty thousands of an inch. Such a beam is capable of scanning vertically upward in the direction, as indicated by arrow 28 wholly within a gap 34 or a row of gaps 34 aligned in the direction of scanning so that the beam never encounters a segment 32. As a result the reading system may interpret that lack of signal as the end of the label reading operation and treat the next set of information as a new label which would be erroneous. Third, the label 10' is often attached to a piece of goods or a vehicle such that the ambient reflective conditions surrounding label 10' are the same nature as those of segments 32. As a result signals derived from stripes 15, 17, 19 and 21 may be so small in contrast to signals representing the label background 36, in comparison to the signals derived from the ambient conditions that the reading system fails to recognize that it is reading a label. The features of this invention are applicable whether there are but two segments 32 separated by one gap 34 or a large number of segments 32 separated by a large number of gaps 34, and whether there are but two segments 32 separated by one gap 38 or a large number of segments 32 separated by a large number of gaps 38. Thus the marks or stripes may be formed of only two segments 32 or many segments extending in both directions.

Figure 3:
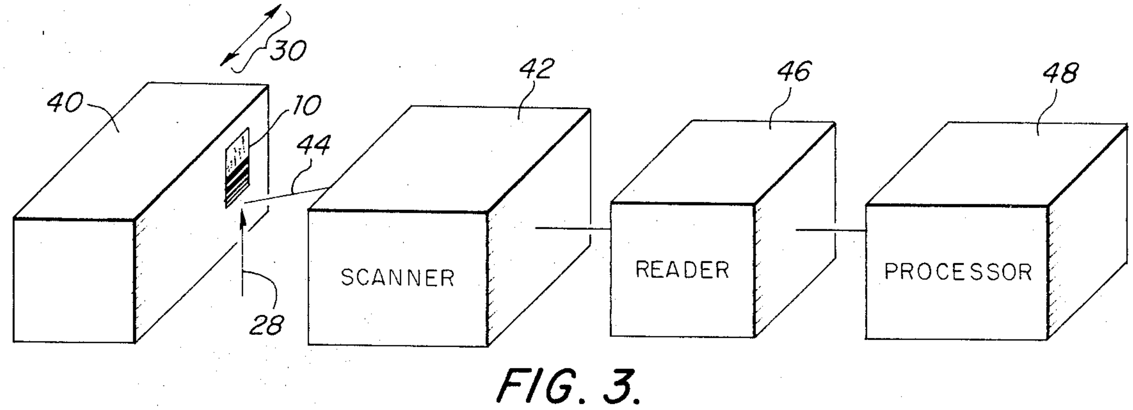
FIG. 3 is an illustrative, axonometric, block diagram of a label reading system employing the improvements according to this invention.

In a typical system label 10 or 10' is attached to a vehicle or a piece of goods 40, FIG. 3, which moves past a scanner 42 in either direction indicated by arrows 30 as label 10 is scanned by narrow scanning beam 44 moving in the vertical direction as shown by arrow 28. The analog signal from scanner 42 is delivered to reader 46 where, inter alia, such signals are digitized and decoded for delivery to a processor 48 such as a minicomputer or a larger general purpose digital computer.

Scanner 42, FIG. 4, includes a laser 50 which provides the scanning beam 44 through a diffuser 54. Diffuser 54 broadens the laser beam in the direction transverse to the direction of scanning of the beam, so that it will be broader than gaps 34 and will be unable to perform a vertical scan wholly within a gap 34 or within a vertical row of such gaps 34 without encountering a segment 32 on at least one side of the gap. Scanning beam 44 is reflected from beam splitter 56 to the surface of one of the plurality of mirrors 58 arranged about the periphery of member 60 which rotates in the direction indicated by arrow 62. The rotation of member 60 imparts the vertical scanning motion to beam 44 as indicated by arrow 28. The returning beam 64 follows essentially the same path as scanning beam 44 except that upon its return it passes through beam splitter 56 and strikes photoelectric sensor 66. The output from photoelectric sensor 66 is submitted to an amplifier 68 which drives the interconnection cables which typically are used between the scanner and reader. The analog signals derived from label 10' are then submitted to noise level suppressor 70 in reader 46 where any high level signals derived from ambient reflective conditions are discriminated and a proper dc level is restored. Following this the signal is converted from analog to digital form by digitizer 72 and submitted to leading edge and trailing delay circuit 74 which operates to except erroneous signals derived from gaps 38 which may produce errors in the operation of the reading system. The output of circuit 74 is then decoded in decoder 76 and submitted to processor 78.

Figure 5:
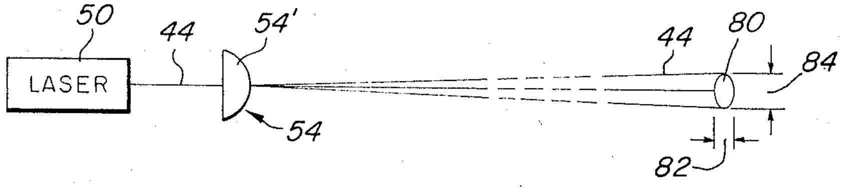
FIG. 5 is a more detailed view of the beam diffuser according to this invention shown in FIG. 4.

Diffuser 54, FIG. 5, may include a cylindrical lens 54' having its cylindrical axis perpendicular to the plane of the paper in FIG. 5. Lens 54' diffuses beam 44 in the direction transverse to the direction of scanning: in FIG. 5 the direction of scanning is perpendicular to the plane of the paper. Thus a typical laser beam having a diameter of forty thousandths of an inch is converted to have a generally elliptical shape 80 which maintains its original width 82 in the direction parallel to the scanning path but increases its width 84 in the direction transverse to the scanning direction. The broadened spot 80', FIG. 2, thereby projected onto label 10' as beam 44 scans label 10' is therefore wide enough to overlap any gap 34 between adjacent segments 32 and eliminate errors which might occur if it were possible for beam 44 to scan completely up label 10' through one or a series of gaps 34 without even encountering a segment or segments 32.

Figure 7A:
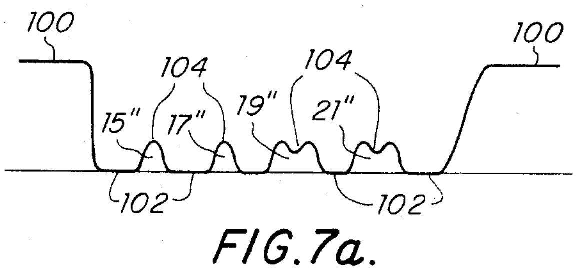
Figure 7B:
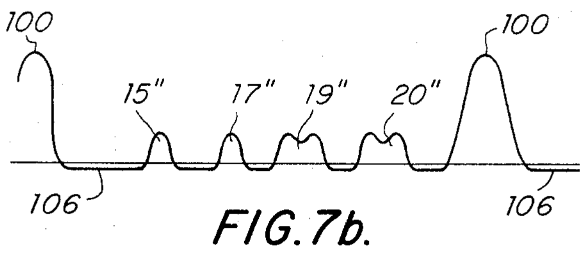

Noise level suppressor 70, FIG. 6, includes a storage device such as a 0.1 uf capacitor 90, a clamping device such as a 1N914 diode 92 having a forward voltage drop of 0.6 volts and a resistor 94 typically of 500 ohms impedance which acts as a timing control to control the charging of capacitor 90. In some embodiments resistor 94 may be omitted from suppressor 70 and its function performed by an equivalent resistance contained in a subsequent circuit. A prolonged high level dc signal at input terminal 96 results in the charging of capacitor 90 so that eventually no current will flow from input terminal 96 to output terminal 98. Diode 92 with its anode connected to ground clamps output terminal 98 to 0.6 volts negative below ground. Thus at input terminal 96 before the signals have been submitted to noise level suppressor 70 the analog signal representing the scan of a typical label may appear as shown in FIG. 7*a*. Initially there is a high signal level 100 derived from the ambient reflective conditions surrounding the object on which the label is fixed; following this when the scanning beam encounters the white edge of the label the signal drops sharply to level 102. Then the signal level moves back and forth between level 102 and slightly higher level 104 describing pulses 15'', 17'', 19'' and 21'' as stripes 15', 17' 19' and 21' are read on label 10'. After the scanning beam completes its traverse of the label and again encounters the ambient reflective conditions it may again rise to the high level 100. Because of the presence of level 100 the authentic information derived from stripes 15', 17', 19' and 21' may be totally ignored or misunderstand by the reading system because the signals representative thereof rise to a much lower level as indicated by level 104. Typically level 100 may be in the neighborhood of 5 volts whereas level 104 may be 1 volt or less. However noise suppressor circuit 70 eliminates this problem first by use of capacitor 90 which arrests the flow of current from such as level 100 after a very short period of time and diode 92 which clamps the output terminal 98 to the level of its forward voltage drop or 0.6 volts in the case of the diode identified previously. Thus as shown in FIG. 7*b* any high signal levels such as level 100 which are derived from ambient reflective conditions are quickly suppressed and clamped to a low voltage (0.6 volts) reference level 106. Thus when stripes 15', 17', 19' and 21' are encountered the previous high level 100 has long since been suppressed and does not enter into the operations of the digitizer and subsequent circuits. After the label has been scanned when the scanning beam reencounters the ambient reflective conditions level 100 may be reached again but only momentarily until capacitor 90 charges up and output terminal 98 reverts to its clamped level 106.

Leading edge and trailing edge delay circuit 74, FIG. 8, includes transistor 110 which has its collector connected to +12 volts through a potentiometer 112 and to one terminal of capacitor 114, Zener diode 116 and comparator 118 through a potentiometer 120. The emitter of transistor 110 and the other terminal of capacitor 110 and Zener diode 116 are connected to ground 122. The other input to comparator 118 is connected to a reference voltage Vr which in this illustrative example has a value of +1 volt. There is an auxiliary discharge circuit 124 connected in a feedback loop between the output 126 of comparator 118 and one of its inputs 128. Auxiliary discharge circuit 124 includes transistor 130 having its collector connected to comparator input 128 and its emitter connected to ground; the base of transistor 130 is connected to ground through resistor 132 and to the output 126 of comparator 118 by means of capacitor 134. Transistors 110 and 130 are typically 2N3904; potentiometers 112 and 120 are typically 5,000 ohms; capacitor 114 is 0.005 uf and capacitor 134 is 100 pf. Resistor 132 is typically 10,000 ohms and Zener diode 116 has a breakdown voltage of +4 volts.

Figures 9A, 9B, 9C, 9D:
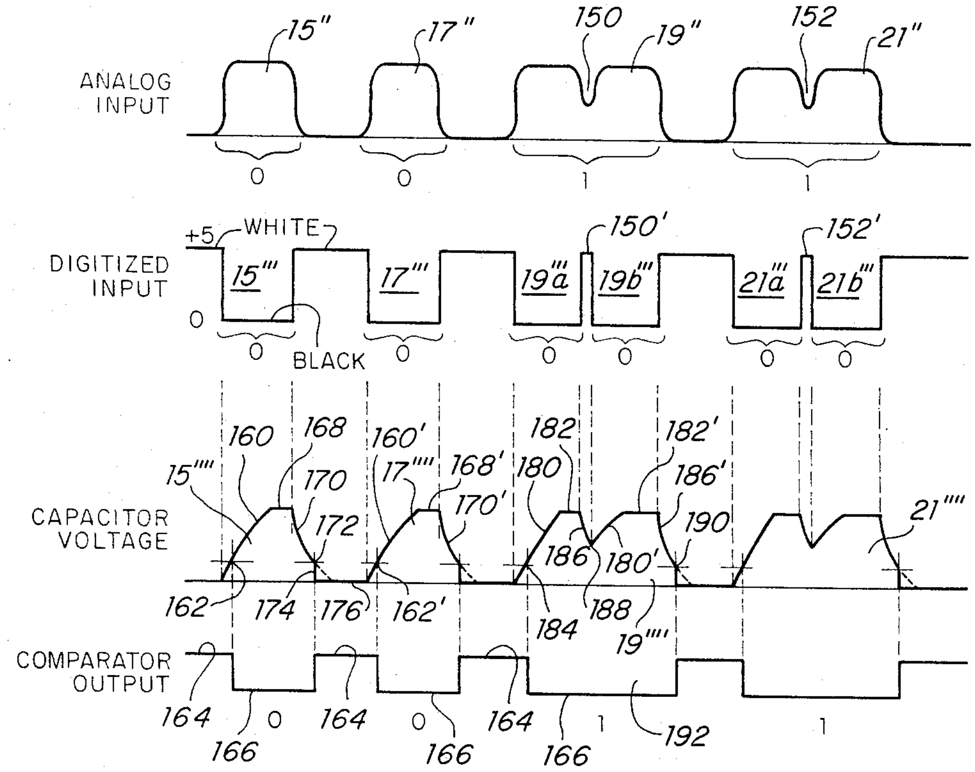

In label 10' the four stripes 15', 17', 19' and 21' are a narrow stripe, a narrow stripe, a wide stripe and a wide stripe which represent the binary number zero, zero, one, one or decimal three. In operation as label 10' is scanned an analog signal is developed, FIG. 9*a*, having two narrow pulses 15'', 17'' which represent binary zeroes followed by two wide pulses, 19'', 21'' which indicate binary ones. However because of the gaps 38 within the wide strips 19'' and 21'' there is an undesirable dip 150, 152 in each of pulses 19'' and 21''. The analog input of FIG. 9*a* is converted in digitizer 72 and the resulting digitized output FIG. 9*b* is developed. A high level, typically +5 volts is regarded as white and a low level typically zero is regarded as black. Analog pulses 15'' and 17'' have been faithfully converted to digital pulses 15'''0 and 17''' indicating a narrow stripe or binary zero. However dips 150 and 152, FIG. 9a, have been digitized as white levels 150' and 152' so that pulses 19'' and 21'' derived from wide stripes 19' and 21' representing binary one have been interpreted as two independent black levels 19'''*a* and 19'''*b* and 21'''*a* and 21'''*b*. As a result as indicated in FIG. 9*b* each of stripes 19' and 21' are interpreted as a pair of narrow stripes or binary zeros as opposed to a single wide stripe or binary one. Thus the digital signal in FIG. 9*b* will be interpreted by the reader as zero, zero, zero, zero, zero, zero instead of zero, zero, one, one.

To prevent this, before the digital output of digitizer 72 is fed to decoder 76 it is first fed to leading edge and trailing edge delay circuit 74, FIG. 8. Generally transistor 110 is normally conducting, capacitor 114 is discharged, and capacitor 134 is charged. When next a negative pulse occurs on the base of transistor 110, transistor 110 is cut off and capacitor 114 begins to charge through potentiometers 112 and 120 at a rate determined by the settings of those potentiometers. At a predetermined point in the charging of capacitor 114 when the voltage level on input 128 to comparator 118 reaches the reference voltage, Vr, the signal at the output 126 of comparator 118 goes from high to low. Following this as capacitor 114 continues to charge, it finally reaches the breakdown voltage of Zener diode 116 and is clipped at that level for the rest of the time that the negative pulse keeps the transistor 110 cut off. When the negative pulse disappears and transistor 110 is again conducting, capacitor 114 begins to discharge beginning at the level set by the breakdown voltage of Zener diode 116. The rate of discharge is determined by the setting on potentiometer 120. When capacitor 114 has discharged sufficiently so that the voltage 128 on comparator 118 drops below the reference voltage the output 126 of comparator 118 goes from low to high. When output 126 went from high to low, capacitor 134 discharged; with the transition of the output 126 from low to high, capacitor 134 now charges and turns on transistor 130. With the conduction of transistor 130 capacitor 114 now has a direct low impedance path to ground and immediately completes its discharge. When output 126 returns from high to low capacitor 134 discharges again, transistor 130 is once again cut off and circuit 74 is now ready to accommodate the next negative pulse.

The operation of circuit 74 may be better understood with reference to FIGS. 9*b*, 9*c* and 9*d*. When negative pulse 15''', FIG. 9*b*, is applied to the base of transistor 110, FIG. 8, transistor 110 begins to conduct and capacitor 114 begins to charge as shown by path 160, FIG. 9*c;* at point 162 the voltage on capacitor 114 and at input 128 of comparator 118 reaches the reference voltage, Vr, and the output 126 of comparator 118 switches from high 164 to low 166, FIG. 9*d*. After continued charging along path 160 the voltage on capacitor 114 reaches the breakdown voltage 168 of Zener diode 116 and the voltage is clipped at that point. When the negative pulse 15''' ceases and transistion to positive occurs capacitor 114 begins to discharge along path 170. At point 172 when the voltage across capacitor 114 and at the input of 128 of comparator 118 goes below the reference voltage the output 126 of comparator 118 transitions from low 166 to high 164 again. This change causes the previously discharged capacitor 134 to charge and turn on transistor 130 which then places an effective short across capacitor 114 and provides the abrupt discharge 174. The input 128 to comparator 118 then remains at that level 176 until the next negative pulse 17''' occurs, whereupon the same process is repeated with respect to waveform 17''''. Upon the receipt of pulse 19''' transistor 110 begins to conduct and charges capacitor 114 along path 180 to the Zener clipping level 182. Along the way at point 184 where the voltage across capacitor 114 reaches the reference voltage, Vr, the output 126 of comparator 118 switches from high 164 to low 166. Now when negative pulse **19'''*a* falsely transitions toward positive because of the erroneous white level 150', capacitor 114 begins to discharge along path 186. However the discharge path 186 stops at point 188 well above the level of point 184 at which the output of 126 of comparator 118 transitions because, at point 188 the next negative pulse 19'''*b* is encountered and causes capacitor 114 to begin charging again along path 180' until it reaches the Zener clipping level 182'. At the end of negative pulse 19'''*b* capacitor 114 begins to discharge again along path 186' and this time completes its path down to point 190 whereupon the output 126 of comparator 118 transitions from low 166 to high 164 and the auxiliary discharge circuit 124 quickly discharges the remaining charge in capacitor 114. Thus the waveform 19'''' produces not two but one pulse 192 at the output 126 even though it had two pulses 19'''*a* and 19'''*b* submitted to it at its input at the base of transistor 110. A similar result obtains with respect to waveform 21''''. In this manner the gaps 150 and 152 which produce the erroneous white levels 150' and 152' may be excepted from the data presented to the decoder and the errors caused by gaps 38 thereby eliminated. The resulting output of comparator 118 as indicated in FIG. 9*d* is zero, zero, one, one which is the correct data for label 10'. Leading edge and trailing edge delay circuit 74** is also useful to eliminate spurious pulses from other sources which may cause errors in the label reading system.

Other embodiments will occur to those skilled in the art and are within the following claims:

What is claimed is:

1. In a label reading system for reading marks formed of at least two segments the improvement including means for excepting a signal derived from a contrasting gap between two such segments comprising:

a capacitor and a charging circuit for charging said capacitor;

gating means for discharging said capacitor in response to a signal derived from a gap and enabling said charging circuit to charge said capacitor in response to a signal derived from a segment;

a comparator having a first input connected to said capacitor and a second input connected to a reference voltage, said comparator producing a first signal when said capacitor is charged to a voltage which is greater than said reference voltage and a second signal when said capacitor is charged to a voltage which is less than said reference voltage; and a clipping circuit connected to said first input to limit the voltage to which said capacitor can be charged to a value greater than said reference voltage for standardizing the initial level at which discharge of said capacitor begins at the end of each segment, said level being set at a value high enough with respect to said reference voltage to prevent the capacitor voltage from decreasing to said reference voltage during the interval of a gap, whereby the output of said comparator produces a representation of a mark formed of two or more segments excepting interstitial gaps.

2. The system of claim 1 further including an auxiliary discharge circuit for rapidly discharging said capacitor below said reference voltage including second gating means connected to said capacitor and responsive to a change in the output of said capacitor, resulting from the voltage at said first input decreasing below said reference voltage, for providing a low impedance discharge path to fully discharge said capacitor before a subsequent segment is sensed.

* * * * *